United States Patent
Jaradi et al.

(10) Patent No.: US 11,724,665 B1
(45) Date of Patent: Aug. 15, 2023

(54) LOAD-LIMITING ASSEMBLY FOR SEATBELT

(71) Applicant: Ford Global Technologies, LLC, Dearborn, MI (US)

(72) Inventors: Dean M. Jaradi, Macomb, MI (US); Mohammad Omar Faruque, Ann Arbor, MI (US); S. M. Iskander Farooq, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/748,079

(22) Filed: May 19, 2022

(51) Int. Cl.
  *B60R 22/28* (2006.01)
  *B60R 22/20* (2006.01)
  *B60R 22/24* (2006.01)
  *B60R 22/18* (2006.01)

(52) U.S. Cl.
  CPC ............ *B60R 22/28* (2013.01); *B60R 22/201* (2013.01); *B60R 22/24* (2013.01); *B60R 2022/1818* (2013.01); *B60R 2022/286* (2013.01)

(58) Field of Classification Search
  CPC .................................................... B60R 22/28
  See application file for complete search history.

(56) References Cited

U.S. PATENT DOCUMENTS

| | | | |
|---|---|---|---|
| 2,680,476 A | 6/1954 | Saffell | |
| 4,027,905 A | 6/1977 | Shimogawa et al. | |
| 5,234,181 A | 8/1993 | Schroth | |
| 5,265,908 A | 11/1993 | Verellen et al. | |
| 5,566,978 A * | 10/1996 | Fleming | B60R 22/1951 297/480 |
| 5,700,034 A * | 12/1997 | Lane, Jr. | B60R 21/01 280/805 |
| 6,099,078 A | 8/2000 | Smithson et al. | |
| 6,129,385 A | 10/2000 | Blackadder | |

(Continued)

FOREIGN PATENT DOCUMENTS

| | | |
|---|---|---|
| CN | 108608984 A | 10/2018 |
| CN | 208855587 U | 5/2019 |

(Continued)

OTHER PUBLICATIONS

Non-Final Office Action for U.S. Appl. No. 17/750,627, filed May 23, 2022, as issued by the USPTO dated Feb. 2, 2023.

(Continued)

*Primary Examiner* — Nicole T Verley
(74) *Attorney, Agent, or Firm* — Frank A. MacKenize; Bejin Bieneman PLC

(57) ABSTRACT

An assembly for a vehicle includes a pillar elongated along an axis. A seatbelt guide is supported by the pillar. The seatbelt guide is moveable relative to the pillar along the axis. The vehicle includes a seatbelt retractor and a webbing. The webbing is retractably extendable from the retractor. The seatbelt retractor is below the seatbelt guide. The webbing extends upwardly from the retractor and around the seatbelt guide. The vehicle includes a load limiter. The load limiter has a lower end fixed to the pillar. The load limiter has an upper end. The upper end is between the seatbelt guide and the lower end. The load limiter is crushable relative to the seatbelt guide and the pillar.

17 Claims, 7 Drawing Sheets

(56) References Cited

U.S. PATENT DOCUMENTS

| | | | |
|---|---|---|---|
| 6,145,881 A * | 11/2000 | Miller, III | B60R 22/20 |
| | | | 280/808 |
| 6,209,916 B1 | 4/2001 | Smithson et al. | |
| 6,336,664 B1 | 1/2002 | Roder | |
| 6,736,427 B2 | 5/2004 | Herrmann et al. | |
| 6,913,288 B2 | 7/2005 | Schulz | |
| 6,935,701 B1 | 8/2005 | Arnold et al. | |
| 7,226,120 B2 * | 6/2007 | Yamazaki | F16F 7/015 |
| | | | 188/371 |
| 7,331,610 B2 * | 2/2008 | Herrmann | B60R 22/20 |
| | | | 297/480 |
| 8,800,735 B2 | 8/2014 | Ruthinowski et al. | |
| 3,820,789 A1 | 9/2014 | Merrill et al. | |
| 9,027,964 B2 | 5/2015 | Neero et al. | |
| 9,238,448 B2 | 1/2016 | Wier et al. | |
| 9,499,121 B2 * | 11/2016 | Dingman | B60R 22/28 |
| 9,738,248 B2 | 8/2017 | Dingman et al. | |
| 9,809,193 B2 * | 11/2017 | Marriott | B60R 22/28 |
| 10,953,847 B2 * | 3/2021 | Hamilton | B60R 22/202 |
| 10,981,537 B2 | 4/2021 | Vega et al. | |
| 11,273,790 B2 | 3/2022 | Hamilton et al. | |
| 11,505,159 B2 | 11/2022 | Jaradi et al. | |
| 11,639,153 B2 | 5/2023 | Farooq et al. | |
| 2003/0116954 A1 | 6/2003 | Singer | |
| 2005/0206215 A1 | 9/2005 | Arnold et al. | |
| 2011/0133439 A1 | 6/2011 | Pearce | |
| 2014/0042282 A1 | 2/2014 | Neero et al. | |
| 2017/0267208 A1 | 9/2017 | Marriott et al. | |
| 2018/0222440 A1 | 8/2018 | Grzic et al. | |
| 2020/0238948 A1 | 7/2020 | Williams | |
| 2020/0339063 A1 | 10/2020 | Jaradi et al. | |

FOREIGN PATENT DOCUMENTS

| | | |
|---|---|---|
| FR | 2695603 A1 | 3/1994 |
| GB | 2382802 A | 11/2003 |
| KR | 20020027901 A | 4/2002 |
| KR | 102260808 B1 | 6/2021 |
| WO | 2009082304 A1 | 7/2009 |

OTHER PUBLICATIONS

Non-Final Office Action for U.S. Appl. No. 17/750,627, filed May 23, 2022, as issued by the UPSTO dated Jun. 14, 2023.

* cited by examiner

LOAD-LIMITING ASSEMBLY FOR SEATBELT

BACKGROUND

A seatbelt in a vehicle may be equipped with "load-limiting" features. During a vehicle impact, a retractor of the seatbelt may lock webbing of the seatbelt from further extension from the retractor, and load-limiting features may permit some additional limited extension of the webbing when the force exerted on the webbing exceeds a load-limiting threshold. This additional extension of the webbing from the retractor limits the load applied by the webbing to the chest of an occupant, which may reduce chest compression.

The function of the load-limiting features is dependent upon the size of the occupant, e.g., the weight and/or height of the occupant. In other words, at a given speed of the vehicle impact, a large occupant may exert a load on the webbing exceeding the load-limiting threshold whereas, at that same speed, the load exerted on the webbing by a small occupant may not exceed the load-limiting threshold.

DETAILED DESCRIPTION

Figure 1:
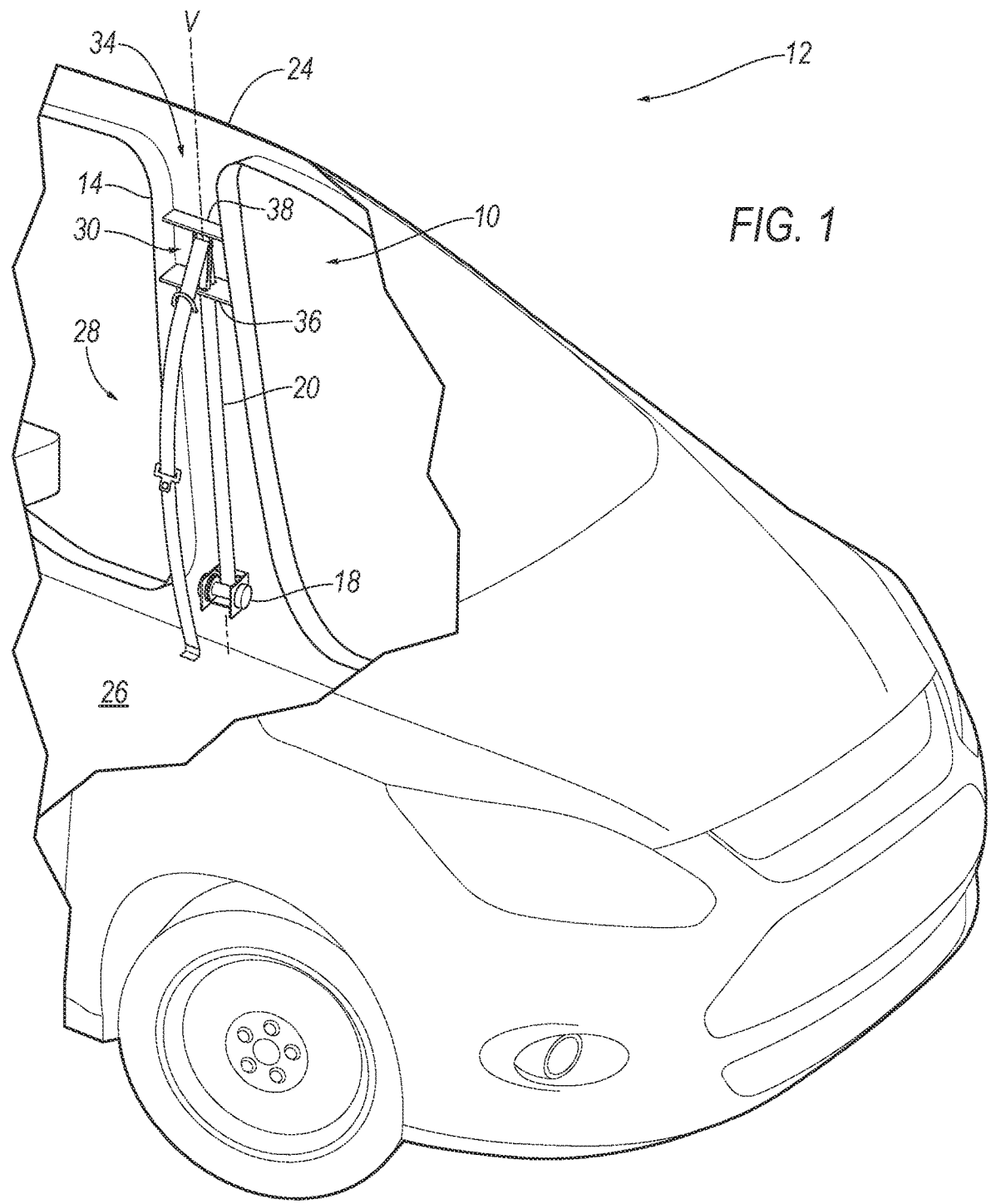
FIG. 1 is a cut-away view a vehicle showing a seatbelt assembly and a load-limiting assembly.
Figure 2:
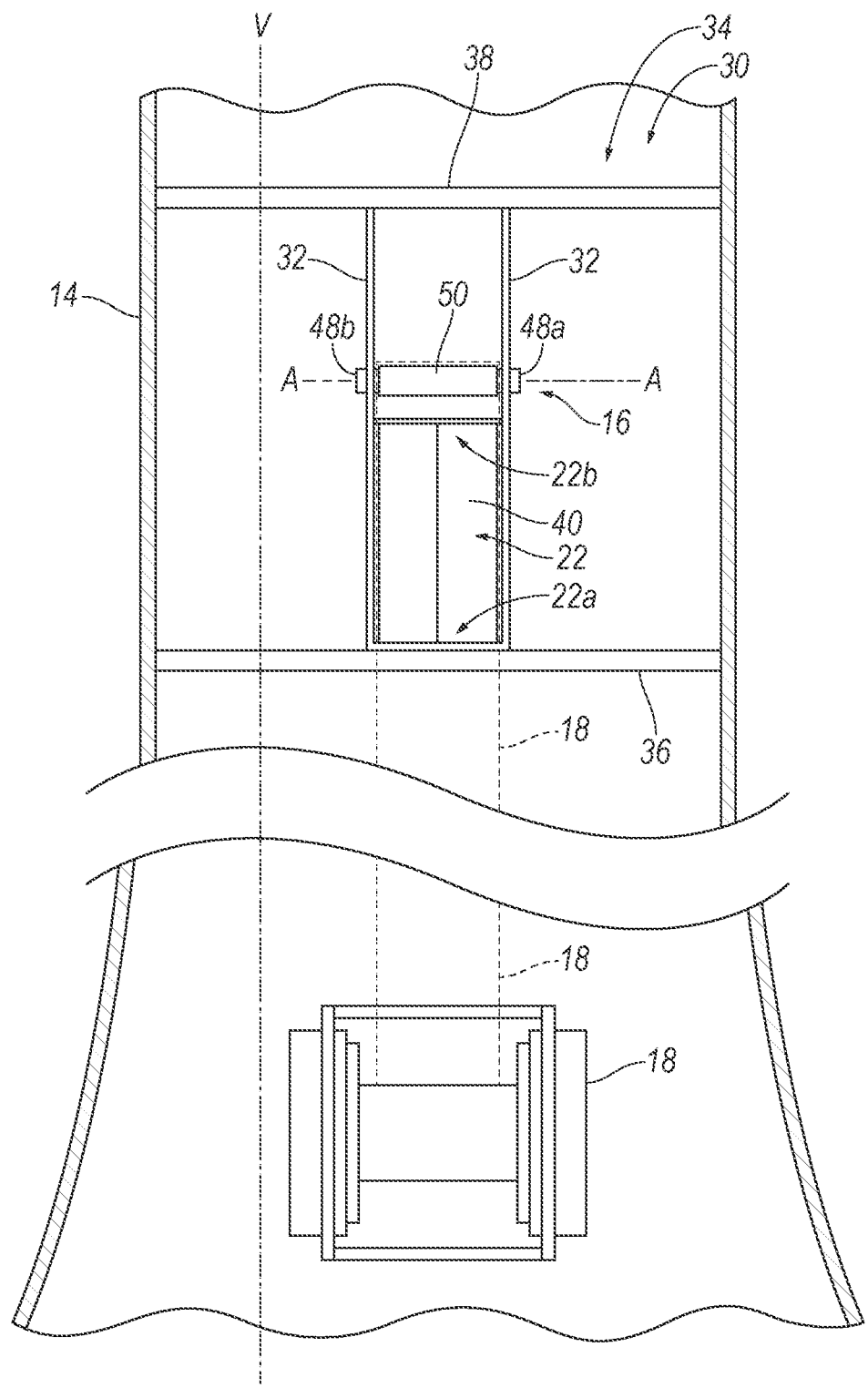
FIG. 2 is a side view of a pillar of the vehicle, a seatbelt assembly, and a load-limiting assembly.

With reference to the Figures, wherein like numerals indicate like parts throughout the several views, an assembly 10 for a vehicle 12 is shown. The assembly 10 includes a pillar 14 elongated along an axis V. A seatbelt guide 16 is supported by the pillar 14. The seatbelt guide 16 is moveable relative to the pillar 14 along the axis V. The vehicle 12 includes a seatbelt retractor 18 and a webbing 20. The webbing 20 is retractably extendable from the retractor. The seatbelt retractor 18 is below the seatbelt guide 16. The webbing 20 extends upwardly from the retractor and around the seatbelt guide 16. The vehicle 12 includes a load limiter 22. The load limiter 22 has a lower end 22a fixed to the pillar 14. The load limiter 22 has an upper end 22b. The upper end 22b is between the seatbelt guide 16 and the lower end 22a. The load limiter 22 is crushable relative to the seatbelt guide 16 and the pillar 14.

During sudden deceleration of the vehicle 12, e.g., during a vehicle impact, an occupant may be urged in the vehicle-forward direction. When the occupant is urged in the vehicle-forward direction, the occupant exerts a force on the webbing 20. In such an instance, the retractor restricts payout of the webbing 20 and the webbing 20 controls the kinematics of the occupant. As a result, the force is exerted by the occupant through the webbing 20 to the seatbelt guide 16. When the force exerted by the occupant is above a threshold force, the seatbelt guide 16 crushes the load limiter 22. Specifically, the load limiter 22 is deformed relative to the pillar 14 by the seatbelt guide 16. Because the seatbelt guide 16 crushes the load limiter 22, the seatbelt guide 16 moves toward the lower end 22a of the load limiter 22 to release tension on the webbing 20 against the occupant. Specifically, the crushing of the load limiter 22 reduces loads applied by the webbing 20 against the chest of the occupant.

The vehicle 12 may be any suitable type of ground vehicle, e.g., a passenger or commercial automobile such as a sedan, a coupe, a truck, a sport utility, a crossover, a van, a minivan, a taxi, a bus, etc. The vehicle 12 includes a frame and a body (not numbered). The body may be of unibody construction, in which the frame is unitary with the body including frame rails, rockers, pillars 14, roof rails, etc. As another example, the body and frame may have a body-on-frame construction (also referred to as a cab-on-frame construction) in which the body (including rockers, pillars 14, roof rails, etc.) and frame are separate components, i.e., are modular, and the body is supported on and affixed to the frame. Alternatively, the frame and body may have any suitable construction. The frame and the body may be of any suitable material, for example, steel, aluminum, and/or fiber-reinforced plastic, etc.

The vehicle body includes at least one pillar 14. For example, the vehicle body may include an A-pillar and a B-pillar on each side of the vehicle 12. The pillars 14 are elongated along the axis V. The vehicle body may include a roof 24 and a floor 26 of the vehicle 12. The roof 24 and the floor 26 are spaced from each other along the axis V. As shown in the Figures, the pillars 14 extend upwardly from the floor 26 to the roof 24.

The frame and/or the body defines a passenger compartment (not numbered) to house occupants, if any, of the vehicle 12. The passenger compartment may extend across the vehicle 12, i.e., from one side to the other side of the vehicle 12. The passenger compartment includes a front and a rear. The passenger compartment includes one or more seats (not shown). The seats may be arranged in any suitable manner in the passenger compartment. The seats may be of any suitable type, e.g., a bucket seat as shown in the Figures.

The vehicle 12 includes a seatbelt assembly 28. The seatbelt assembly 28 includes the seatbelt retractor 18 and the webbing 20 retractably extendable from the retractor. The seatbelt assembly 28 may include an anchor (not numbered) coupled to the webbing 20, and a clip that engages a buckle (not numbered). The seatbelt assembly 28 may be disposed adjacent the seat. For example, the seatbelt assembly 28 may be adjacent the front seat. The seatbelt assembly 28, when fastened in normal operation, retains the occupant on the seat, e.g., during sudden decelerations of the vehicle 12.

The webbing 20 may extend continuously from the seatbelt retractor 18 to the anchor. For example, one end of the webbing 20 feeds into the seatbelt retractor 18, and the other end of the webbing 20 is fixed to the anchor. The anchor may, for example, be fixed to the seat. Alternatively, the anchor may be fixed to the vehicle body, e.g., the B-pillar, the floor 26, etc. The anchor may be attached to the seat in any suitable manner, e.g., with fasteners. The seatbelt assembly 28 may include a D-ring (not numbered) supporting the webbing 20 inboard of the seatbelt guide 16.

The webbing 20 may be fabric, e.g., polyester. The clip slides freely along the webbing 20 and, when engaged with the buckle, divides the webbing 20 into a lap band and a shoulder band.

The seatbelt assembly 28 may be a three-point harness, meaning that the webbing 20 is attached at three points around the occupant when fastened: the anchor, the seatbelt retractor 18, and the clip. The seatbelt assembly 28 may, alternatively, include another arrangement of attachment points.

The seatbelt retractor 18 is below the seatbelt guide 16. The seatbelt retractor 18 may be supported at any suitable location in the vehicle 12 below the seatbelt guide 16. Since the retractor is below the seatbelt guide 16, the webbing 20 extends upwardly from the retractor and around the seatbelt guide 16.

The seatbelt retractor 18 may be moveable from an unlocked position to a locked position by conventional mechanisms known in the art. In the unlocked position, the webbing 20 may be paid from and retracted into the seatbelt retractor 18. In the locked position, the seatbelt retractor 18 prevents extension of the webbing 20 to limit the forward movement of the occupant. The seatbelt retractor 18 may be in the unlocked position by default, i.e., in the absence of a sudden deceleration. The seatbelt retractor 18 may change from the unlocked position to the locked position during a sudden deceleration of the vehicle 12, i.e., deceleration triggers components of the seatbelt retractor 18 to change from the unlocked position to the locked position.

The seatbelt retractor 18 includes a locking device (not shown). The locking device may be any suitable locking device known in the art, e.g., weighted pendulum/pawl, centrifugal clutch, etc. The locking device is engaged with other components of the seatbelt retractor 18, e.g., a spool, to restrict payout of the webbing 20 from the seatbelt retractor 18. In the unlocked position, the locking device allows payout of the webbing 20 from to the seatbelt retractor 18 and, in the locked position, the locking device prevents payout of the webbing 20 from the seatbelt retractor 18.

The locking device may be triggered to the locked position in any suitable manner. As one example, the locking device may engage the spool in the locked position in response to sudden deceleration of the vehicle 12. Specifically, the locking device may be moved from the unlocked position to the locked position by vehicle deceleration, as is known in the art.

The vehicle 12 includes a load-limiting assembly 30 for reducing the load applied by the webbing 20 to the occupant. During a vehicle 12 impact, as described above, the retractor may lock the webbing 20 of the seatbelt assembly 28 from further extension from the retractor, and load-limiting assembly 30 limits tension on the webbing 20 when the force exerted on the webbing 20 exceeds a load-limiting threshold. This limiting of tension of the webbing 20 from the retractor limits the load applied by the webbing 20 to the chest of an occupant, which may limit chest compression. The operation of the load-limiting assembly 30 is dependent upon the size of the occupant, e.g., the weight and/or height of the occupant. In other words, at a given speed of the vehicle 12 impact, a large occupant may exert a load on the webbing 20 exceeding the load-limiting threshold whereas, at that same speed, the load exerted on the webbing 20 by a small occupant may not exceed the load-limiting threshold.

The load-limiting assembly 30 includes the seatbelt guide 16, a track 32 supporting the seatbelt guide 16 on the pillar 14, and the load limiter 22. The load limiter 22 supports the seatbelt guide 16. The webbing 20 of the seatbelt assembly 28 extends upwardly from the seatbelt retractor 18, over the seatbelt guide 16, and downwardly to the anchor that connects the webbing 20 to the body of the vehicle 12. The clip of the seatbelt assembly 28 is between the seatbelt guide 16 and the anchor. During operation, the webbing 20 slides and/or rolls across the seatbelt guide 16 as webbing 20 is extended from and retracted into the seatbelt retractor 18. During sudden deceleration of the vehicle 12, the seatbelt retractor 18 is triggered to the locked position, as described above, and the force of the occupant is exerted on the seatbelt guide 16 by the webbing 20. In the event the force on the seatbelt guide 16 exceeds a threshold, the seatbelt guide 16 crushes the load limiter 22 to reduce tension of the webbing 20 across the occupant.

The load-limiting assembly 30 is fixed to the pillar 14. As an example, shown in the figures, the load-limiting assembly 30 may include a frame 34 that supports the load limiter 22 and the seatbelt guide 16. In such an example, the frame 34 includes a bottom plate 36, a top plate 38 above the bottom plate 36, and a pair of tracks 32 spaced from each other and extending from the bottom plate 36 to the top plate 38.

The load-limiting assembly 30 may be adjustable upwardly and downwardly relative to the pillar 14, i.e., along the axis V, between a plurality of fixed positions. Specifically, the load-limiting assembly 30 may be adjustable between the fixed positions by an occupant. When adjusted to a fixed position, the frame 34 is locked to the pillar 14. Specifically, the pillar 14 may include a track (not shown) that guides the frame 34 to the various positions and the frame 34 is locked to the track in any one of the fixed positions. The occupant may lock and unlock the frame 34 in the fixed position with a locking mechanism such as, for example, slots, T-channels, spring-loaded pins, solenoids, etc. Specifically, the occupant may operate the locking mechanism by manual operation (through a push-button, lever, etc.) or electronic operation (through a switch, human-machine interface, etc.) to lock and unlock the frame 34 relative to the pillar 14. In such an example, the occupant initially sets the position of the load-limiting assembly 30 relative to the pillar and leaves the load-limiting assembly 30 in that position during operation of the vehicle 12. When locked in one of the fixed positions, the frame 34 of the load-limiting assembly 30 is immovable relative to the pillar 14 absent unlocking by the occupant. Specifically, when locked in one of the fixed positions, the lower end 22a of the load limiter 22 is fixed to the pillar 14 through the frame 34 to absorb energy from the seatbelt guide 16. As another example, the frame 34 may be fixed to the pillar 14, e.g., by welding, fasteners, adhesive, etc.

The bottom plate 36 and the top plate 38 are transverse to the axis V. For example, the axis V may be normal to the bottom plate 36 and the top plate 38. The bottom plate 36 and the top plate 38 may be of any suitable material, e.g., steel, aluminum, fiber reinforced composite, etc.

The load-limiting assembly 30 may include at least one track 32. In the example shown in the figures, as set forth above, the load-limiting assembly 30 may include a pair of tracks 32. The track 32 is fixed to the pillar 14. In examples including the bottom plate 36, the pair of tracks 32 extend upwardly from the bottom plate 36 to the top plate 38. The pair of tracks 32 may be spaced from each other along the longitudinal axis of the vehicle 12. The pair of tracks 32 are oriented such that the seatbelt guide 16 is moveable along the axis V in the tracks 32. Specifically, the tracks 32 each include an elongated slot 32a that receives the seatbelt guide 16, as described further below.

In examples including the bottom plate 36, the tracks 32 are supported on the bottom plate 36. Specifically, the pair of tracks 32 may be fixed to the bottom plate 36. The pair of tracks 32 may be fixed to the top plate 38. The pair of tracks 32 may be fixed to the bottom plate 36 and/or the top plate 38 in any suitable manner, e.g., fasteners, welding, adhesive, etc.

The load limiter 22 is fixed to the pillar 14. Specifically, the load limiter 22 has the lower end 22a fixed to the pillar 14. The load limiter 22 may be fixed to the pillar 14 directly or indirectly. As an example, shown in the Figures, the lower end 22a of the load limiter 22 may be supported on the bottom plate 36 and the bottom plate 36 is fixed to the pillar 14. In such an example, the load limiter 22 is indirectly fixed to the pillar 14.

The load limiter 22 includes the upper end 22b. The upper end 22b of the load limiter 22 is between the seatbelt guide 16 and the lower end 22a. The load limiter 22 extends upwardly from the lower end 22a to the upper end 22b. Specifically, the load limiter 22 extends upwardly from the lower end 22a to the upper end 22b generally along the axis V.

The upper end 22b of the load limiter 22 may support the seatbelt guide 16. In other words, the weight of the seatbelt guide 16 may be borne by the upper end 22b of the load limiter 22. The upper end 22b of the load limiter 22 may abut the seatbelt guide 16.

Figure 3:
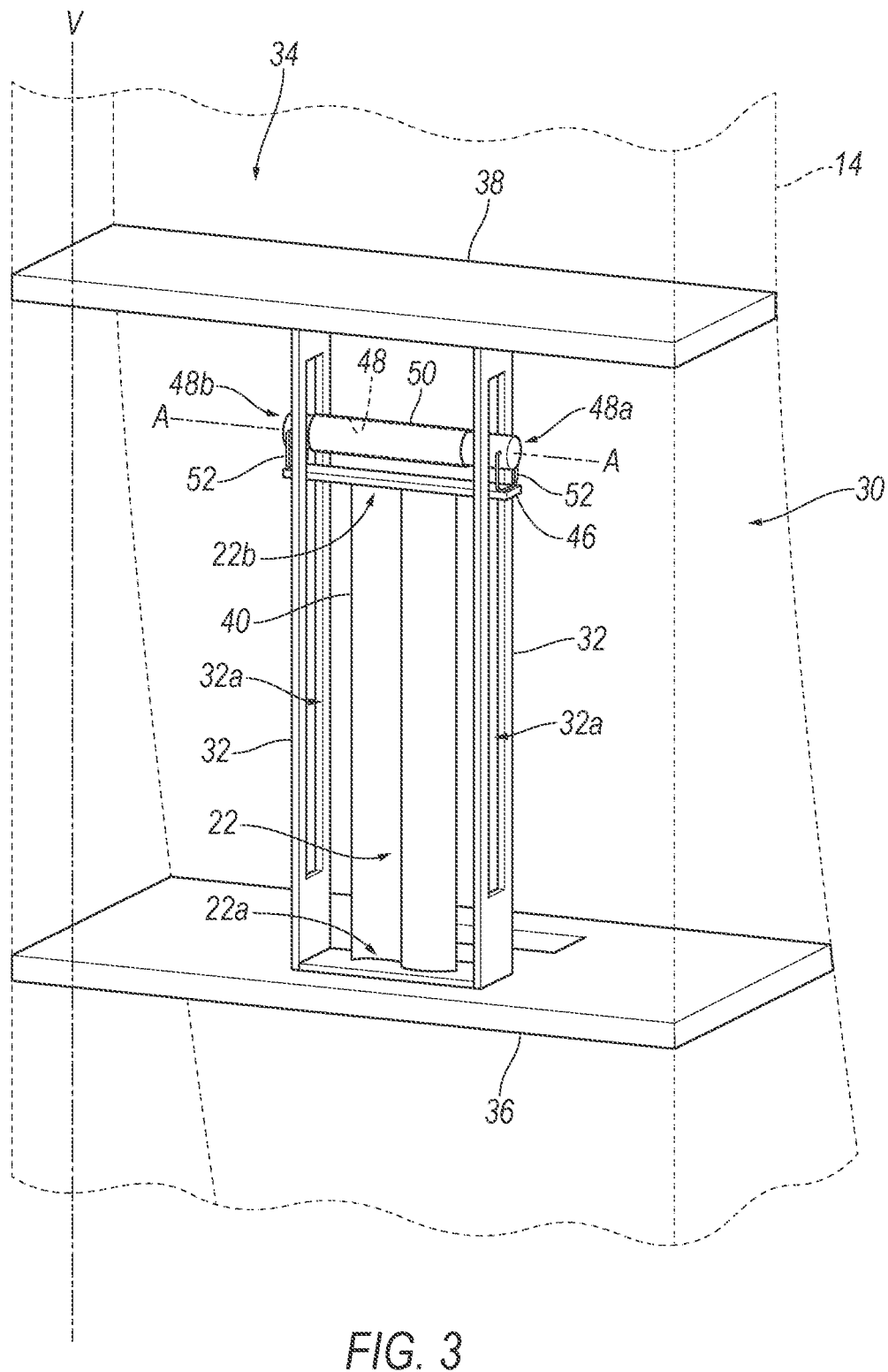
FIG. 3 is a perspective view of one example of the load-limiting assembly including one load limiter.
Figure 4:
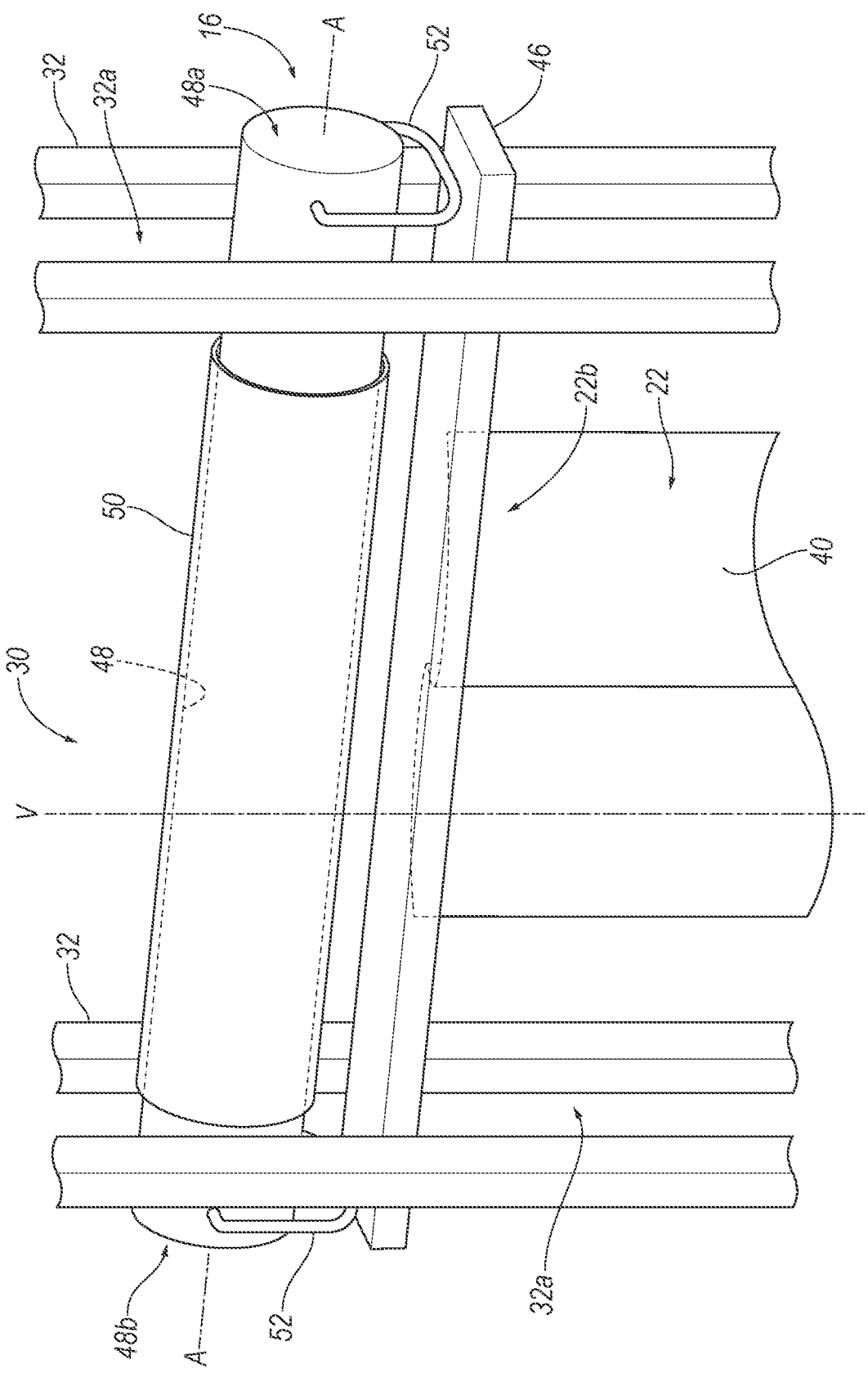
FIG. 4 is a perspective view of a portion of the load-limiting assembly of FIG. 3.
Figure 5:
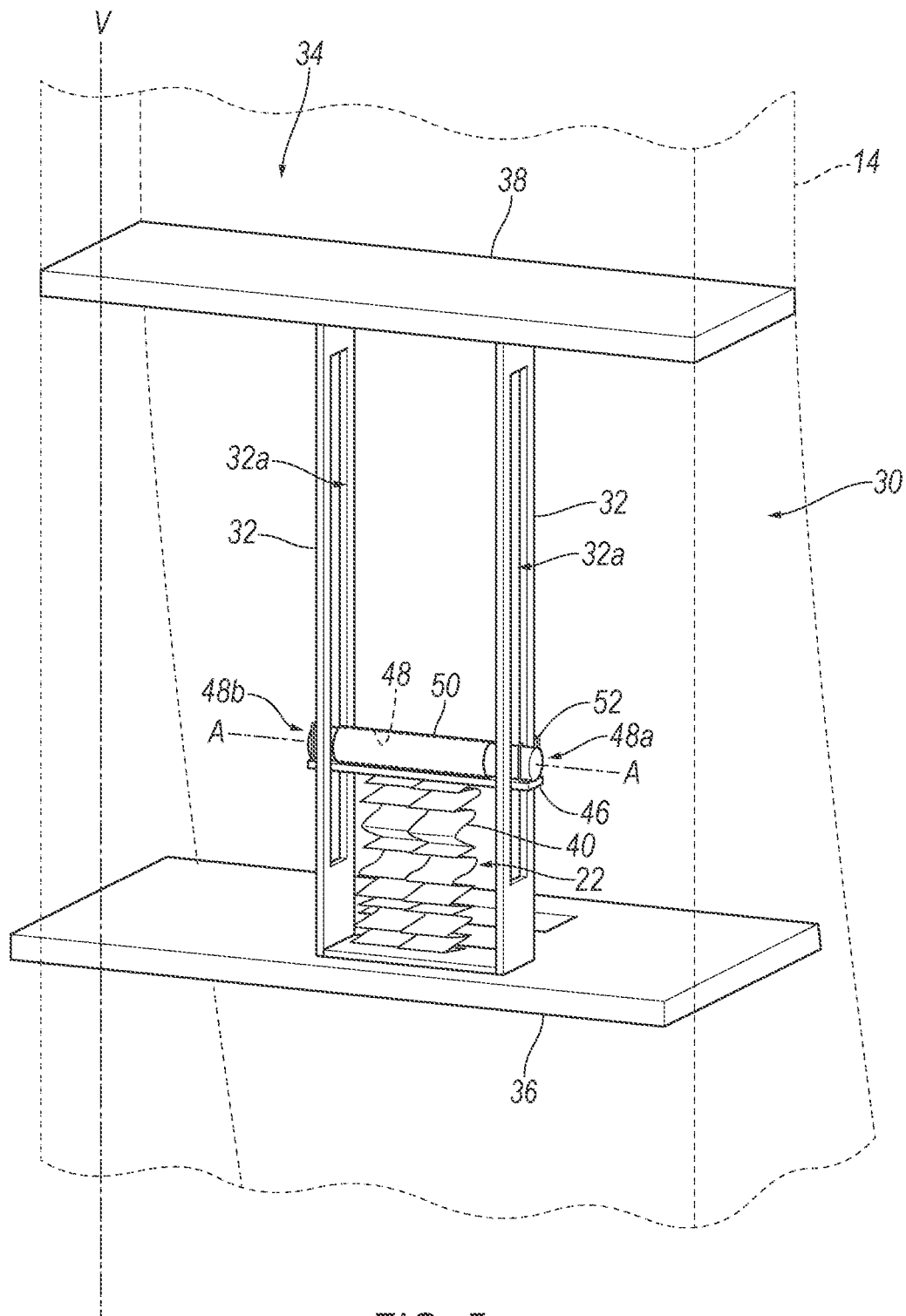
FIG. 5 is a perspective view of the load limiting assembly with the load limiter crushed by the seatbelt guide.

The load limiter 22 may be a panel 40, as shown in the example in FIGS. 3-5. As another example, the load limiter 22 may include a plurality of panels 40, 42, 44, as shown in the example in FIGS. 6-7. Common numerals are used to identify common features of the load-limiting assembly 30 of FIGS. 3-5 and the load-limiting assembly 30 of FIGS. 6-7.

As set forth above, the panel 40 includes the upper end 22b and the lower end 22a of the load limiter 22. The panel 40 is elongated along the axis V from the lower end 22a of the load limiter 22 to the upper end 22b of the load limiter 22.

The load limiter 22, and more specifically the panel 40, may be S-Shaped. Specifically, a cross-section of the panel 40 through the axis V is S-Shaped. As another example, the cross-section of the panel 40 may be any suitable shape, e.g., V-shaped, straight, curved, accordion, etc. The panel 40 may be, for example, metal or any other suitable material.

The load limiter 22 is plastically deformable relative to the pillar 14 under a compressive load between the seatbelt guide 16 and the pillar 14. Specifically, the load limiter 22, and more specifically the panel 40, is crushable relative to the pillar 14. When force on the seatbelt guide 16 from the webbing 20 exceeds a threshold compressive force of the panel 40, the panel 40 plastically deforms relative to the pillar 14. Since the panel 40 is plastically deformable relative to the pillar 14, the panel 40 is crushed and the seatbelt guide 16 moves downwardly and controls tension of the webbing 20 across the occupant.

The load limiter 22, and specifically the panel 40, has a threshold compressive force. The threshold compressive force is a maximum force that can be exerted on the panel 40 from the upper end 22b to the lower end 22a along the axis V before the load limiter 22 begins to plastically deform. In other words, the load limiter 22 is designed to remain substantially undeformed under compressive forces below the threshold compressive force.

Since the seatbelt guide 16 is supported by the upper end 22b of the load limiter 22, the seatbelt guide 16 can, as described further below, exert a compressive force on the load limiter 22 and, in the example shown in the figures, the bottom plate 36 acts as a reaction surface for the lower end 22a of the load limiter 22. When the seatbelt guide 16 exerts a compressive force on the load limiter 22 that is greater than the threshold compressive force, the load limiter 22 is crushed, i.e., plastically deformed.

Figure 6:
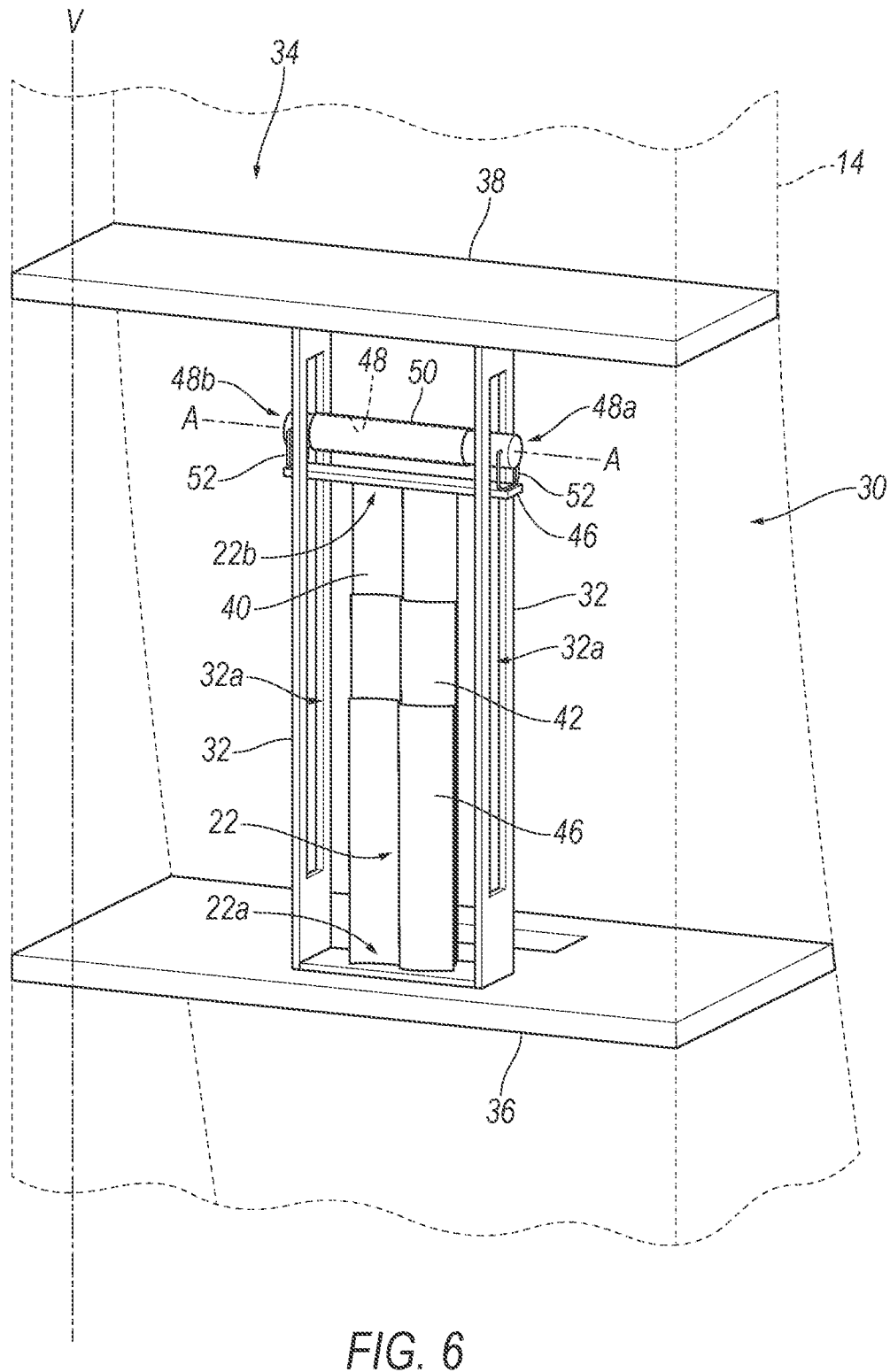
FIG. 6 is a perspective view of another example of the load-limiting assembly including three load limiter.
Figure 7:
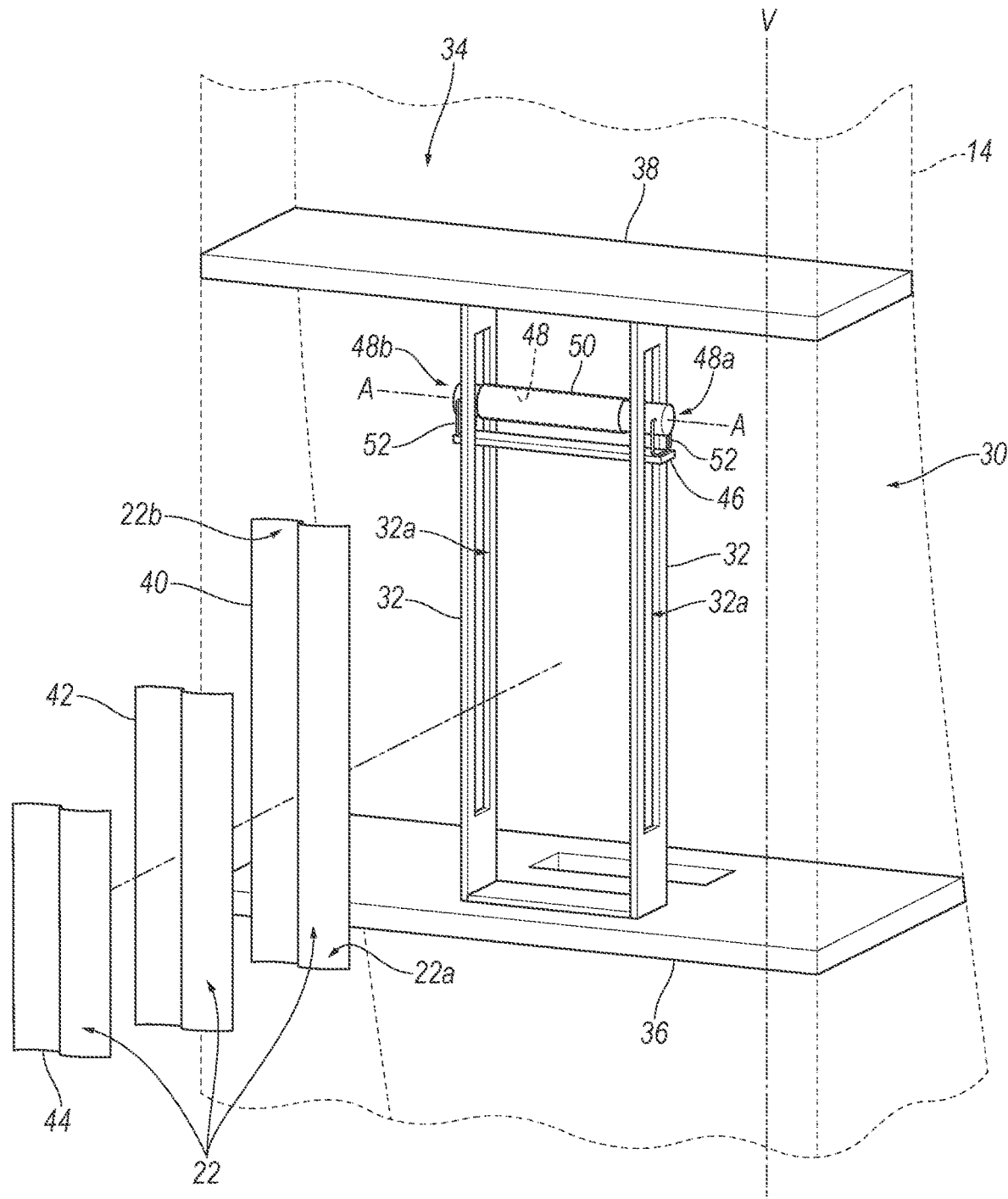
FIG. 7 is an exploded view of the three load limiters of the load-limiting assembly of FIG. 6.

With reference to FIGS. 6-7, the load limiter 22 may include a plurality of panels 40, 42, 44, including the panel 40. For example, in the example shown in FIGS. 6-7, the load limiter 22 includes the panel 40, a second panel 42, and a third panel 44. The panel 40, the second panel 42, and third panel 44 may be nested with each other. In other words, the panel 40, the second panel 42, and the third panel 44 may have a common shape such that the panel 40 is received by and fits into the second panel 42 and such that the second panel 42 is received by and fits into the third panel 44. In the example shown in FIGS. 6-7, the panel 40 is S-shaped, as described above, and the second panel 42 and third panel 44 have corresponding S-shapes that nest. The second panel 42 and the third panel 44 may be of the same material or different material than each other and the panel 40. As an example, the pane 40, the second panel 42, and the third panel 44 may be each be metal and, in such an example, may be the same type or different types of metal.

In examples including a plurality of panels 40, 42, 44, the plurality of panels 40, 42, 44 may be designed to provide progressive load limiting of the webbing 20 across the occupant. In other words, after initial deformation of at least one of the panels 40, 42, 44, 42, 44, increased force is required for further deformation.

For example, the plurality of panels 40, 42, 44 may each have a different height relative to each other. In the example shown in the figures, the panel 40 is taller than the second panel 42 and the second panel 42 is taller than the third panel 44. In operation, when compressive force exceeding the threshold compressive force is applied by the seatbelt guide 16 on the upper end 22b of the panel 40, the panel 40 crushes, as described above. As the seatbelt guide 16 moves downwardly along the track 32 during crush of the panel 40, the seatbelt guide 16 abuts the second panel 42. The force of the webbing 20 on the seatbelt guide 16 must exceed the combined threshold compressive force of both the panel 40 and the second panel 42 to crush the panel 40 and the second panel 42. In the event the force of the webbing 20 on the seatbelt guide 16 exceeds the combined threshold compressive force of both the panel 40 and the second panel 42, as the seatbelt guide 16 moves downwardly along the track 32 during crush of the panel 40 and the second panel 42, the seatbelt guide 16 abuts the third panel 44. The force of the webbing 20 on the seatbelt guide 16 must exceed the combined threshold compressive force of the panel 40, the second panel 42, and the third panel 44 to crush the panel 40, the second panel 42, and the third panel 44. In such examples, the panel 40, second panel 42, and third panel 44 may each have a different individual compressive threshold force. Specifically, the second panel 42 and/or the third panel 44 may have different threshold compressive forces that may be higher or lower than the threshold compressive force of the panel 40. The different compressive threshold forces may be obtained, for example, by differences in wall thickness, differences in material type, etc., between the panel 40, the second panel 42, and the third panel 44.

The seatbelt guide 16 is supported by the pillar 14. In the example shown in the figures, the seatbelt guide 16 is supported on the load limiter 22, specifically the panel 40, which is supported by the bottom plate 36, which is fixed to the pillar 14 as described above. The seatbelt guide 16 is supported by the load limiter 22, specifically the plate, in that the weight of the seatbelt guide 16 is borne by the load limiter 22. Specifically, the weight of the seatbelt guide 16 is borne by the upper end 22b of the panel 40.

The seatbelt guide 16 is moveable relative to the pillar 14 along the axis V. Specifically, the seatbelt guide 16 is moveable downwardly along the track 32 when the compressive force of the seatbelt guide 16 exceeds the threshold compressive force of the load limiter 22. In other words, the seatbelt guide 16 is moveable relative to the pillar 14 along the axis V when the load limiter 22 is being crushed.

The seatbelt guide 16 is slideably engaged with the tracks 32. The seatbelt guide 16 may include a guide plate 46 and the guide plate 46 is slideably engaged with the tracks 32. In operation, as described above, the seatbelt guide 16, i.e., the guide plate 46, is moveable downwardly toward the bottom plate 36 to crush the load limiter 22. The guide plate 46 is moveable downwardly in the tracks 32, i.e., slideably engaged with the tracks.

The guide plate 46 may abut the upper end 22b of the load limiter 22. Specifically, the guide plate 46 may abut the upper end 22b of the panel 40. In other words, the guide plate 46 is the interface between the seatbelt guide 16 and the load limiter 22. The guide plate 46 may, for example, be of a similar size and shape as the bottom plate 36. As another example, the guide plate 46 may be of any suitable size and shape.

The seatbelt guide 16 may include a rod 48. The rod 48 has an axis A that is perpendicular to the axis V. The rod 48 is elongated along the vehicle-longitudinal axis. Specifically, the rod 48 may be elongated between the tracks 32.

The rod 48 is positioned above the load limiter 22, i.e., between the load limiter 22 and the roof 24. Specifically, in examples with the guide plate 46, the rod 48 is positioned above the guide plate 46. As shown in the Figures, the webbing 20 extends around the rod 48, i.e., the webbing 20 extends over the rod 48.

The rod 48 may be fixed or rotatable relative to the tracks 32. In examples where the rod 48 is rotatable, the rod 48 rotates when the webbing 20 is extended from and retracted into the retractor. In examples where the rod 48 is fixed, the rod 48 may be of a low friction or frictionless material to encourage sliding of the webbing 20 relative to the rod 48. The low friction or frictionless material may be, for example, polytetrafluoroethylene (PTFE). The rod 48 may be of any suitable shape, e.g., cylindrical, octagonal, etc. The rod 48 may be of any suitable material, e.g., steel, aluminum, plastic, composite, etc.

The seatbelt guide 16 may include a sleeve 50. In such examples, the sleeve 50 surrounds the rod 48. Specifically, as shown in the Figures, the sleeve 50 is elongated between the tracks 32 and extends endlessly around the rod 48. The sleeve 50 may be rotatable on the rod 48 or fixed to the rod 48. As an example where the sleeve 50 is rotatable on the rod 48, as the webbing 20 is extended from and retracted into the retractor, the webbing 20 moves over the seatbelt guide 16 and the sleeve 50 rotates on the rod 48. As an example where the sleeve 50 is fixed to the rod 48, the sleeve 50 does not rotate on the rod 48 when webbing 20 is extended from and retracted into the retractor and the webbing 20 slides over the seatbelt guide 16. In examples where the sleeve 50 is fixed to the rod 48, the sleeve 50 may be of a low friction or frictionless material to encourage sliding of the webbing 20 relative to the sleeve 50. The low friction or frictionless material may be, for example, polytetrafluoroethylene (PTFE). The sleeve 50 may be of any suitable shape, e.g., cylindrical, octagonal, etc. The sleeve 50 may be of any suitable material, e.g., steel, aluminum, plastic, composite, etc. The sleeve 50 may be of the same or different material as the rod 48.

The seatbelt guide 16 may include a pair of risers 52 fixed to the guide plate 46. In the example shown in the figures, the rod 48 and/or the sleeve 50 are connected to the risers 52 and spaced from the guide plate 46. Specifically, the rod 48 has a first end 48a and a second end 48b, and the pair of risers 52 are disposed at the first end 48a and the second end 48b. In other words, the rod 48 and/or the sleeve 50 are spaced upwardly from the guide plate 46 because the risers 52 extend upwardly from the guide plate 46 and the rod 48 is connected to the risers 52 at the first end 48a and the second end 48b. The connection between the rod 48 and the risers 52 is breakable. As shown in the Figures, the connection between the rod 48 and the risers 52 is broken by a compressive force exerted on the rod 48 by the seatbelt. In examples with the risers 52, the connection is broken by when the compressive force on the rod 48 is higher than the threshold yield strength of the connection between the risers 52 and the rod 48. The threshold yield strength of the connection between the risers 52 and the rod 48 is lower than the threshold compressive yield strength of the load limiter 22. In other words, in operation, the connection between the risers 52 and the rod 48 will break before the load limiter 22 is plastically deformed, i.e., crushed.

The seatbelt guide 16 is moveable relative to the pillar 14 independently of the other components of the load-limiting assembly 30 during a sudden vehicle deceleration. As an example, during sudden deceleration, when the compressive force exceeds the threshold yield strength of the connection between the rod 48 and the risers 52, the connection breaks and the rod 48 exerts a force on the guide plate 46. The guide plate 46 thus exerts a compressive force on the load limiter 22, i.e., the panel 40, and if the compressive force exerted by the guide plate 46 exceeds the threshold compressive force of the load limiter 22, the load limiter 22 is crushed. When the load limiter 22 is crushed, tension of the webbing 20 across the occupant is limited, i.e., limiting chest compression as a result of the webbing 20.

This disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. An assembly comprising:
    a pillar elongated along an axis;
    a seatbelt guide supported by the pillar and moveable relative to the pillar along the axis;
    a seatbelt retractor and a webbing retractably extendable from the retractor;
    the seatbelt retractor being below the seatbelt guide and the webbing extending upwardly from the retractor around the seatbelt guide; and
    a load limiter having a lower end fixed to the pillar and the load limiter having an upper end between the seatbelt guide and the lower end;
    the load limiter includes a panel and a second panel, the panel and the second panel having a common shape such that the panel is received by and fits into the second panel; and
    the load limiter being crushable relative to the seatbelt guide and the pillar.

2. The assembly as set forth in claim 1, wherein the load limiter is plastically deformable relative to the pillar under a compressive load between the seatbelt guide and the pillar.

3. The assembly as set forth in claim 1, wherein the panel is elongated along the axis.

4. The assembly as set forth in claim 3, wherein the panel is S-Shaped.

5. The assembly as set forth in claim 1, wherein the panel and the second panel have different heights.

6. The assembly as set forth in claim 1, further comprising a bottom plate fixed to the pillar, the lower end of the load limiter being supported on the bottom plate.

7. The assembly as set forth in claim 6, wherein the seatbelt retractor is below the bottom plate.

8. The assembly as set forth in claim 6, further comprising at least one track extending upwardly from the bottom plate, the seatbelt guide being slideably engaged with the track.

9. The assembly a set forth in claim 6, wherein one of the panel and the second panel extends a first distance upwardly from the lower plate along the axis and the other of the panel and the second panel extends a second distance upwardly from the lower plate along the axis, the first distance being greater than the second distance.

10. The assembly as set forth in claim 9, wherein the seatbelt retractor is below the bottom plate.

11. The assembly as set forth in claim 10, further comprising at least one track extending upwardly from the bottom plate, the seatbelt guide being slideably engaged with the track.

12. The assembly as set forth in claim 1, further comprising at least one track fixed to the pillar, the seatbelt guide being slideably engaged with the track.

13. The assembly as set forth in claim 1, wherein the seatbelt guide includes a rod, the webbing extending around the rod.

14. The assembly as set forth in claim 13, wherein the rod is elongated along a second axis perpendicular to the axis.

15. The assembly of claim 13, wherein the seatbelt guide includes a sleeve rotatably supported on the rod, the webbing extending around the sleeve.

16. The assembly as set forth in claim 1, wherein the seatbelt retractor is below the lower end of the load limiter.

17. The assembly as set forth in claim 1, wherein the seatbelt guide is supported by the load limiter.

\* \* \* \* \*